United States Patent [19]

Coate et al.

[11] 4,420,404
[45] Dec. 13, 1983

[54] PROCESS FOR DEWATERING FINE GRANULAR MATERIALS

[75] Inventors: David W. Coate; Joseph G. Selmeczi, both of Pittsburgh, Pa.

[73] Assignee: Dravo Corporation, Pittsburgh, Pa.

[21] Appl. No.: 330,227

[22] Filed: Dec. 14, 1981

Related U.S. Application Data

[63] Continuation-in-part of Ser. No. 226,691, Jan. 21, 1981, abandoned.

[51] Int. Cl.³ .............................................. B01D 33/00
[52] U.S. Cl. ..................................... 210/808; 210/350
[58] Field of Search ............... 210/808, 806, 767, 350, 210/225, 224, 196, 230, 805; 100/41, 37, 106, 127, 125, 226, 110, 238; 264/86; 425/84; 162/382

[56] References Cited

U.S. PATENT DOCUMENTS

| | | | |
|---|---|---|---|
| 2,018,932 | 10/1935 | Thorne | 100/238 |
| 2,697,979 | 12/1954 | MacMurray | 100/116 |
| 3,033,104 | 5/1962 | Manaresi | 100/125 |
| 3,856,675 | 12/1974 | Sze et al. | 210/805 |
| 4,208,188 | 6/1980 | Dick | 44/10 |
| 4,263,330 | 4/1981 | Streeter et al. | 210/808 |
| 4,347,137 | 8/1982 | Dick, Jr. | 210/329 |

FOREIGN PATENT DOCUMENTS 278176  1/1966  Australia ............. 210/225

*Primary Examiner*—Charles N. Hart
*Assistant Examiner*—Wanda L. Millard
*Attorney, Agent, or Firm*—Parmelee, Miller, Welsh & Kratz

[57] ABSTRACT

A process for the dewatering of fine granular material is disclosed. During compression of the material, fluid is expressed and a small percentage of the material is intentionally permitted to escape through a self-cleaning opening in the apparatus. By maintaining the smallest dimension of the opening in the range of one to five times the diameter of the largest particle in the material, the opening remain essentially clear of any material which could cause plugging.

4 Claims, 5 Drawing Figures

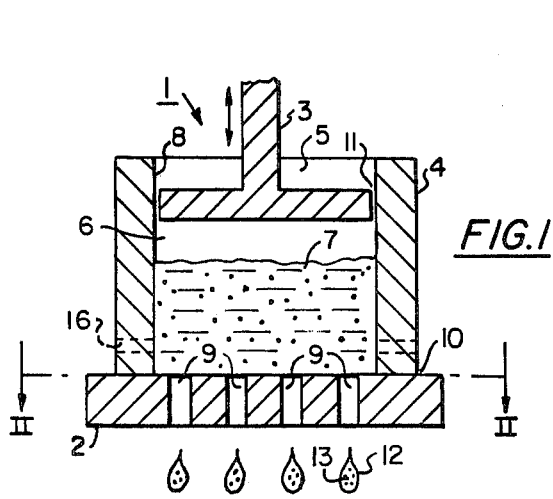
*FIG.1*
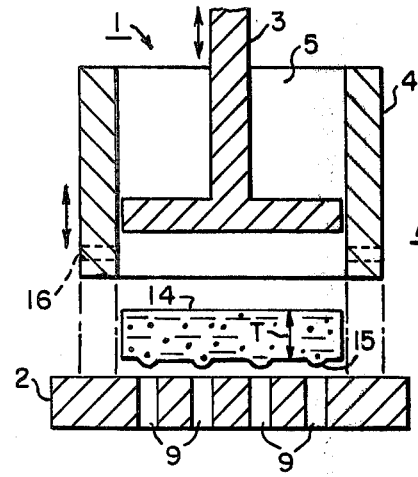
*FIG.3*
*FIG.2*
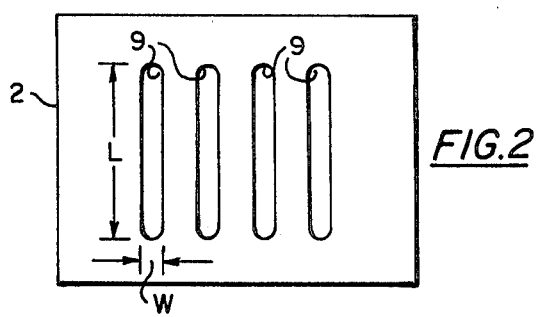
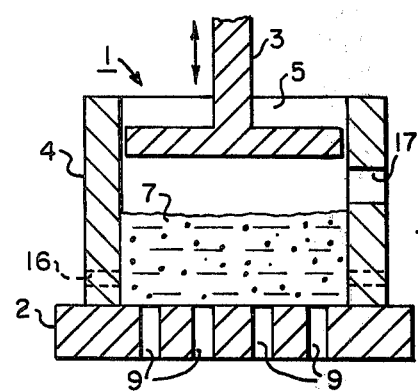
*FIG.4*
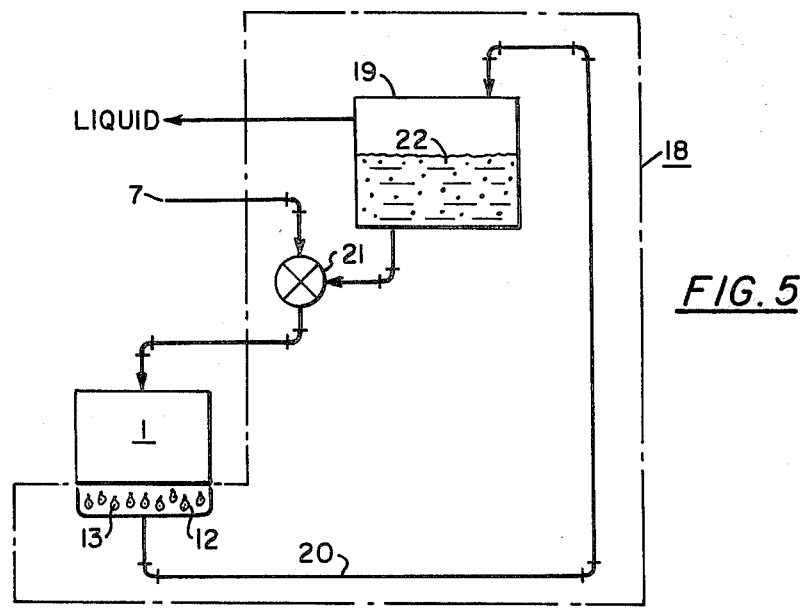
*FIG.5*

PROCESS FOR DEWATERING FINE GRANULAR MATERIALS

This application is a continuation-in-part of our application Ser. No. 226,691 filed on Jan. 21, 1981 and now abandoned.

This invention relates to a process for the dewatering of fine granular materials which are present in the underflow of solid-liquid separating devices, such as thickeners, or in filter cakes produced, for example, by filtration or centrifugal means.

BACKGROUND

Wet granular materials, such as those produced by sedimentation, filtration, or centrifuging from slurries, generally require some dewatering, partial or complete, in order to improve their handling and storage qualities. For example, the underflow from thickeners used to collect the water employed in coal cleaning processes contains from 25 percent to 35 percent coal and 65 percent to 75 percent water. The use of vacuum filters can reduce the amount of water to the range of 25 percent to an excess of 30 percent depending upon the relative coarseness of the solid particles. Centrifuges, which are costlier than vacuum filters in terms of capital, energy and maintenance expenses, may be utilized to reduce the moisture content to about 18 percent. However, the filter cakes produced by either centrifuges or vacuum filters are sloppy and subject to freezing in cold weather. Additionally, these filter cakes usually contain more moisture than is desirable, even after mixing with drier, coarser fractions, for different end uses such as pulverized coal combustion or as feed to coke-making ovens.

In order to facilitate handling and storage and to reduce the moisture content of the total washed material to an acceptable level of approximately 6 percent of final use, thermal drying is practiced. Thermal drying is very energy intensive and also necessitates the extensive use of pollution control means. In the thermal drying of moist coal, for example, a fire hazard may exist during the drying process due to overdrying caused by the variability of the moisture content of the coal being dried.

Another means of dewatering materials involves the use of presses. Typically, presses are utilized with fibrous materials which, when compressed, produce a matted mass that prevents the loss of solids and the occlusion of any drain openings. Press dewatering of granular materials, while being less costly than any of the above referenced methods, also has a variety of attendant difficulties. The major problem is that the drains or openings in the devices used in such a process tend to become plugged with the material being compressed. This plugging inhibits the escape of the expressed fluid from the materials. Various means have been developed to circumvent this problem including the use of self-cleaning tapered openings or the mechanical or fluid cleaning of the openings. Examples of such prior art are disclosed in U.S. Pat. Nos. 1,448,774; 2,398,135; 3,520,411; 4,043,832 and 4,159,947.

In U.S. Pat. No. 4,208,188 a dewatering apparatus is disclosed which utilizes a porous drainage member having a quasi-triangular porous structure similar to a woven screen having a mesh size in the range of about 50 to 100 microns. During compression, water drains through the drainage screen and the solid particles consolidate and tend to agglomerate and bridge the interstices of the screen rather than following the tortuous path through the screen. Use of the above described means leads to either increased construction costs or increased complexity in the structure of the dewatering apparatus over presses employing the self-cleaning slotted openings of the present invention. While this patent does not address the problem of the plugging of the porous drainage member during operation, it appears that this member would be subject to this problem in contrast to an apparatus employing the invention disclosed herein.

SUMMARY OF THE INVENTION

Briefly described, the present invention comprises a process for the dewatering of fine granular materials. The apparatus for carrying out the invention consists of a base member, a compressing member and a housing member for holding the material. Either the base member or the compressing member or both may contain drainage openings made in accordance with the present invention. In addition, these drainage openings may also be defined by the junction of base member and housing member or the interface between compressing member and housing member. The drainage openings may be slotted, circular, annular, or arcuate. The housing member has a passage therethrough which is in communication with the base member. The base, compressing and housing members when positioned for the dewatering operation define an enclosed compression chamber having drainage openings as disclosed herein. In one embodiment the passage in the housing member receives both the material and the compressing member. In an alternate embodiment the housing member has two openings—a passage therethrough which is in communication with the base member and is used to receive the compressing member and an opening in the side of the housing member which is in communication with the passage and is used to conduct the material into the housing member. The drainage openings are open and form a non-tortuous path leading from the compression chamber. The preferred orientation of the drainage openings is in a direction perpendicular to a plane formed by or parallel to the member or members defining the drainage openings. Upon the application of compressive force in the range of 10,000 to 20,000 psi for approximately 10 seconds, fluid is expressed from the material via the nontortuous paths through the drainage openings. At the same time, a small portion of the material is intentionally permitted to escape with the expressed fluid. This occurs because the smallest dimension of the drainage openings is made one to five times larger than the diameter of the largest particle in the granular material. Material continues to escape until the intergranular friction of the particles in the material prevents further fluidization of the material. At this point the particles agglomerate and form bridges over the drainage openings. These bridges prevent the further escape of material. They appear as projections on the surface of the puck which is formed as a result of the compression. When the puck is withdrawn from the apparatus, the bridges, being a part of the puck, are also removed; thus, keeping the drainage openings clear. While a small percentage of the material is expressed, the net effect of these interactions is that the bulk of the material is retained inside the housing and is compressed into a puck having a lowered moisture content in the range of 10 percent. When material having a diameter more than five times smaller than the smallest dimension of the drainage openings is to be dewatered, a layer of material having a particle size one to five times smaller than the smallest dimension of the drainage openings is placed between the finer material and the openings to serve as a sealer/filter layer.

Thus one object of this invention is to provide a process utilizing apparatus with self-cleaning openings for the dewatering of fine granular materials which reduces the moisture content of wet, fine granular materials in an energy efficient manner while eliminating pollution and fire hazards. A further object is to provide a coarse, free flowing, puck-like product that is easily handled, transported, and stored.

Other objects, features and advantages of the present invention will become apparent upon reading the following specification when taken in conjunction with the accompanying drawings.

BRIEF DESCRIPTION OF THE DRAWINGS

FIG. 1 is a vertical cross-sectional view of a dewatering apparatus incorporating the features of the invention.

FIG. 2 is a sectional view taken along line II—II of FIG. 1.

FIG. 3 is a vertical cross-sectional view of a modified form of the dewatering apparatus shown in an open position to illustrate detachable mounting of the housing.

FIG. 4 is a vertical cross-sectional view of an alternate embodiment of the invention utilizing separate openings in the housing member for receiving the compression member and the material to be compressed.

FIG. 5 is a schematic representation of a dewatering apparatus utilizing a means for recirculating the fluid expressed.

DETAILED DESCRIPTION

Referring to the drawings, the apparatus 1 for dewatering fine granular material comprises a base member 2, a compressing member 3 and a housing member 4 having a passage 5 extending therethrough which is in communication with the base member 2. The base member 2, compressing member 3 and housing member 4 define an enclosed compression chamber 6. The compressing member 3 and the material 7 to be compressed are received into the housing member via the passage 5. Except as noted below, the passage 5 is made to closely receive the compressing member 3 in order to prevent the escape of material 7 between the edge of the compressing member 3 and the inner wall 8 of the housing members 4. The base member 2 is shown having slotted drainage openings 9 extending therethrough. These slotted drainage openings 9 may be located in the base member 2, the compressing member 3, or both. While slotted drainage openings are shown in the base member 2, other shapes of drainage openings may be used. As an alternative, drainage openings 9 may be located only at the junction 10 of the base member 2 and the housing member 4, or only at the interface 11 of the inner wall 8 of the housing member 4 and the compressing member 3, or both, or in combination with drainage openings 9 in either the compressing member 3 or base member 2 or both. As the fine granular material 7 is pressed between the compressing member 3 and the base member 2, the material 7 begins to dewater with fluid 12 being expressed through the slotted drainage openings 9, each having a length L which exceeds its width W.

During the initial stages of dewatering, a small percentage of the fine granular material 7 is intentionally allowed to pass with the fluid 12 through the slotted drainage openings 9 and is defined as escaped material 13. As dewatering continues, the intergranular friction of the particles increases causing the particles to agglomerate and bridge the slotted drainage openings 9. These bridges 15 (See FIG. 3) prevent the continued exit of the material 7. As a result, the bulk of the material 7 is retained in the housing member 4 and is compacted into a hard coarse puck 14 having a thickness T and bridges 15 (See FIG. 3).

The smallest dimension of each of the drainage openings relative to the material particle size is important to the self cleaning feature of this invention as well as to the aforementioned bridging effect. The width of the openings is selected to be one to five times the diameter of the largest particle in the material 7. Such openings remain clear while only about 0.2 to 0.6 percent of the material escapes with the expressed fluid. Overall, it has been found that the percentage of escaped solid material in the expressed fluid is in the range of only about 1 to 3 percent. If the width of the openings is greater than five times the diameter of the largest particle in the material 7, a large portion of the material 7 escapes the dewatering apparatus 1 without adequate dewatering. If the smallest dimension chosen is less than the diameter of the largest particle in the material, the percentage of escaped material found in the fluid expressed decreases; however the drainage openings tend to plug and thus they require frequent cleaning. Accordingly, when the width W of the slotted drainage openings is selected to be 1 to 5 times, preferable two times, the diameter of the largest particle in the material, both self-cleaning and effective dewatering are achieved. When finer granular material, more than five times smaller than the width of the slotted drainage openings, is to be dewatered, granular material with the largest particle having a diameter of one to five times smaller than the width of the drainage openings is placed between the finer material and the openings to serve as a sealer/filter layer. A second sealer/filter layer of fine granular material with the largest particle having a diameter of one to five times smaller than the width of the drainage opening can be placed between the finer granular material and the piston.

It is possible to utilize the apparatus of this invention for the dewatering of any of a variety of fine grained materials. Examples of such materials are beneficiated iron ore, red mud, phosphate slime and coal filtercake. Table I below illustrates the results of the dewatering of coal filtercake obtained from a coal washing plant. The coal filtercake having passed through a screen having 0.6 mm to 0.3 mm openings therein, contained 25 to 30 percent water prior to dewatering. Each test series represents the average results of three to five tests. A cylindrical housing member 4 having a passage 5 with a diameter of 90 mm and a compressing member 3 having a diameter of slightly less than 90 mm were used for the test series. The slotted openings 8 were 180 mm in length and were located in the base member 2.

TABLE I

| Test Series | Compression Pressure (psi) | Compression Time (sec) | Material Compacted Thickness T (mm) | Slot Width W (mm) | Material Particle Top Size (mm) | Material Water Content after Compression (%) | Expressed Fluid Solids Content (% Solids) | Plugging of Slotted Openings |
|---|---|---|---|---|---|---|---|---|
| 1 | 10,000 | 10 | 52 | 0.6 | 0.6 | 11.8 | 2 | No |
| 2 | 10,000 | 10 | 40 | 0.6 | 0.6 | 11.3 | 2 | No |
| 3 | 10,000 | 10 | 22 | 0.6 | 0.6 | 10.2 | 2.1 | No |
| 4 | 10,000 | 10 | 38 | 0.6 | 0.3 | 10.8 | 2.9 | No |
| 5 | 10,000 | 10 | 21 | 0.6 | 0.3 | 9.6 | 2.9 | No |
| 6 | 20,000 | 10 | 62 | 0.6 | 0.6 | 9.9 | 1.9 | No |
| 7 | 20,000 | 10 | 39 | 0.6 | 0.6 | 8.6 | 2.1 | No |
| 8 | 20,000 | 10 | 19 | 0.6 | 0.6 | 8.2 | 2.1 | No |
| 9 | 20,000 | 10 | 60 | 0.6 | 0.3 | 9.8 | 2.8 | No |
| 10 | 20,000 | 10 | 40 | 0.6 | 0.3 | 8.4 | 3.0 | No |
| 11 | 20,000 | 10 | 21 | 0.6 | 0.3 | 8.2 | 3.1 | No |
| 12 | 20,000 | 11 | 24 | 0.1 | 0.3 | 10.8 | 0.3–0.8 | Yes |
| 13 | 20,000 | 11 | 41 | 0.1 | 0.3 | 11.9 | 0.3–0.8 | Yes |
| 14 | 20,000 | 11 | 25 | 0.05 | 0.3 | 13.0 | 0.3–0.8 | Yes |
| 15 | 20,000 | 11 | 39 | 0.05 | 0.3 | 13.9 | 0.3–0.8 | Yes |

In test series 1 through 11, the slotted drainage openings 9 remained clear or essentially clear of material 7. Reducing the ratio of slotted opening width W so that the width W was smaller than the particle size, resulted in increased water content in the puck 14 and plugging of the slotted drainage openings 9. This is seen in the results of the test series 12 through 15.

The puck produced using the invention was firm and maintained its compacted shape, strength and moisture content even when submerged in water for periods exceeding three days. The puck also withstood three freeze/thaw cycles before crumbling. During testing, it was also observed that the puck 14 increased in thickness T, as much as 11 percent after being removed from the dewatering apparatus. This increase in thickness is termed relaxation and it is believed that this relaxation causes the puck to have lower density than those produced by dewatering apparatuses utilizing lower compressive forces and longer compression times.

As indicated above, any of a variety of fine grained materials can be dewatered utilizing the principles of this invention. The following fine grained materials are presented as exemplars only and are not to be construed as the only fine grained materials susceptible to treatment in this dewatering apparatus.

EXAMPLE I

Beneficiated iron ore is a resultant product from a process in which taconite ore with approximately 33 percent iron is first ground to a very fine mesh (325 to 500 mesh) and is then separated from the gangue by a flotation process. It is then typically dewatered by a vacuum filtration process prior to the pelletizing operation that agglomerates the fine grained beneficiated iron ore to a suitable size for blast furnace feed. However, the vacuum filtering operation does not always provide sufficient dewatering and as a result thermal drying which is both expensive and pollution prone has been utilized. Although the beneficiated iron ore is of a very fine mesh with a material particle top size of about 0.04 mm, an effective slot width of 0.19 mm in an apparatus according to this invention resulted in the successful dewatering of the material. Although the slot width is nearly five times the material particle top size, this fine grained material did not tend to escape from the apparatus with the expressed fluid. The particular embodiment of the instant dewatering apparatus utilized for the beneficiated iron ore had a plain platen and the slot through which the fluid was expressed was defined by the annular clearance at the interface 11 of the inner wall 3 of the housing 4 and the compressing member 3.

EXAMPLE II

Red mud is an extremely fine residue from the Bayer Process which converts bauxite ore to alumina for subsequent aluminum production. The red mud consists primarily of iron oxides and has silica and titanium minerals as minor constituents. This material has always presented an aggravating disposal problem for the aluminum industry. Again, filtration techniques are inadequate and thermal techniques are too expensive. Dewatering of the extremely fine red mud, often with as small a particle size as 0.015 mm, was accomplished using a platen with slots 0.6 mm in width. The slotted platen was covered with approximately a 3 mm layer of 28 mesh coal with the largest particle top size being about 0.6 mm. The red mud was loaded on top of this sealer/filter layer to a depth of approximately 40 mm. A second 3 mm layer of 28 mesh coal was placed on top of the red mud to form a sealer/filter between the piston and the red mud. The red mud's water content of about 39 percent was reduced by compression to about 17.6 percent when loaded as described above.

EXAMPLE III

Phosphate slimes are suspensions of very fine (150 mesh) particles of waste products resulting from phosphate mining and beneficiating operations. A concentrate of dilute slime with a water content of about 30 percent could be dewatered to form agglomerates with a water content of about 11.5 percent. Such a dewatered phosphate slime could be used as a stabilized land-fill. Here again it is advantageous to utilize a sealer/filter layer of appropriate material, preferably 28 mesh particles of phosphate.

TABLE II

DEWATERING EXPERIENCE WITH A VARIETY OF FINE GRAINED MATERIALS

| Material | Compression Pressure (psi) | Compression Time (sec) | Effective Slot Width (mm) | Material Particle Top Size (mm) | Sealer-Filter Material Partical Top Size (mm) | Material Water Content Before Compression (%) | Material Water Content After Compression (%) |
| --- | --- | --- | --- | --- | --- | --- | --- |
| Beneficiated Iron Ore | 20,000 | 10 | 0.19 | 0.04 | — | 16.7 | 8.4 |
| Red Mud | 20,000 | 12 | 0.6 | 0.15 | 0.6 | 39.0 | 17.6 |
| Phosphate Slime | 20,000 | 10 | 0.6 | 0.11 | 0.6 | 30.0 | 11.5 |

Table II presents the results of the dewatering of the fine grained materials discussed above. As will be readily understood by those skilled in the art, the apparatus of this invention and the process herein disclosed for utilizing this dewatering press for extremely fine materials may be successfully applied to other fine grained materials not specifically discussed herein.

A modified form of the present invention is illustrated in FIG. 3. There the housing member 4, which is detachably mounted on the base 2, is shown in the open position. During compression of the material 7, the operation is identical to that previously described. After compression, the housing member 4 is separated from the base 2 allowing for the ready removal of the puck 14.

A further modification involves the use of drainage passages 16 in the housing 4 as shown in FIG. 1 to permit fluid 12 to be expressed from the material 7. The diameter of these drainage passages 16 being one to five times, preferably two times, the diameter of the larger particle in the material 6. The operation of the dewatering apparatus 1 is the same as that previously described.

Another modification of the apparatus 1 is presented in FIG. 4. Here an opening 17 is provided which extends through the side of the housing member 4 and into the passage 5. This opening 17 would be used to receive the material 7 while passage 5 would be used to receive the compressing member 3.

In FIG. 5 the invention is shown in schematic form in cooperation with a recycling means 18. The recycling means 18 illustrated has a solid-liquid separating means 19, a means 20 for collecting and transporting the expressed fluid 12 and escaped material 13 to separating means 19, and a means 21 for combining the underflow 22 of the separating means 19 with the material 7 being fed to the apparatus 1.

The forms and features of the particular embodiments of the invention are by way of illustration only and are in no way meant to be restrictive. While the detailed description given illustrates an apparatus utilizing slotted drainage openings made in accordance with the disclosed invention, other apparatus designs having drainage openings made in accordance with the ratios of the smallest dimension of the drainage opening to particle diameter size disclosed will also perform in the same manner as those described. Such openings may be arcuate, circular, or annular-each having its smallest dimension being determined by the size ratios given herein. Furthermore, if annular drainage openings between the housing member and compressing member and/or between the housing member and the base member are incorporated in the design of the apparatus these annular drainage openings may be employed in lieu of, or in conjunction with, the use of drainage openings in the base or compressing member. In addition, numerous changes and other modifications may be made and the full use of equivalents resorted to without departing from the spirit or scope of the invention as defined in the appended claims.

We claim:

1. A process for the dewatering of fine granular material and producing a coarse puck product comprising:
   loading the fine granular material into an enclosed compression chamber having a drainage opening therein which is open and forms a non-tortuous path leading from the compression chamber, and wherein said granular material has a particle size one to five times smaller than the width of said drainage opening; and
   applying a compressive force against the material thereby initially expressing fluid and material from the compression chamber via the non-tortuous path through the drainage opening until the intergranular friction of the particles of the material is increased so that material fluidization ceases allowing agglomeration of the material to occur and bridging of the drainage opening to take place thereby forming a coarse puck product.

2. The process for the dewatering of fine granular material and producing a coarse puck product according to claim 1 wherein the loading step includes loading a second, fine granular material having a particle size more than five times smaller than the width of the drainage opening into the compression chamber, with the fine granular material having a particle size one to five times smaller than said drainage opening being disposed between said drainage opening and said second fine granular material.

3. The process for the dewatering of fine granular material and producing a coarse puck product according to claim 2 wherein the loading step includes loading additional fine granular material having a particle size one to five times smaller than the drainage openings into the compression chamber with the second, fine granular material being disposed between two layers of said granular material having a particle size one to five times smaller than said drainage openings.

4. The process of claims 1 or 3 wherein the material is subjected to a compressive force in the range of about 10,000 psi to 20,000 psi for a time period of less than 1 minute.

* * * * *